US012604893B2

(12) United States Patent
Klessig et al.

(10) Patent No.: US 12,604,893 B2
(45) Date of Patent: Apr. 21, 2026

(54) COMPOSITIONS AND METHODS FOR MODULATING MICROBIOMES

(71) Applicant: BOYCE THOMPSON INSTITUTE FOR PLANT RESEARCH, INC., Ithaca, NY (US)

(72) Inventors: Daniel Klessig, Dryden, NY (US); Murli Manohar, Ithaca, NY (US); Frank Schroeder, Ithaca, NY (US)

(73) Assignee: BOYCE THOMPSON INSTITUTE FOR PLANT RESEARCH, INC., Ithaca, NY (US)

( * ) Notice: Subject to any disclaimer, the term of this patent is extended or adjusted under 35 U.S.C. 154(b) by 950 days.

(21) Appl. No.: 17/621,938

(22) PCT Filed: Jul. 8, 2020

(86) PCT No.: PCT/US2020/041128
§ 371 (c)(1),
(2) Date: Dec. 22, 2021

(87) PCT Pub. No.: WO2021/007280
PCT Pub. Date: Jan. 14, 2021

(65) Prior Publication Data

US 2022/0248672 A1 Aug. 11, 2022

Related U.S. Application Data

(60) Provisional application No. 62/871,478, filed on Jul. 8, 2019.

(51) Int. Cl.
*A01N 43/16* (2006.01)
*A01P 1/00* (2006.01)

(52) U.S. Cl.
CPC ................ *A01N 43/16* (2013.01); *A01P 1/00* (2021.08)

(58) Field of Classification Search
None
See application file for complete search history.

(56) References Cited

U.S. PATENT DOCUMENTS

| | | | |
|---|---|---|---|
| 10,136,595 | B2 | 11/2018 | Klessig et al. |
| 11,019,776 | B2 | 6/2021 | Klessig et al. |
| 11,849,688 | B2 | 12/2023 | Klessig et al. |
| 2010/0256369 | A1 | 10/2010 | Suga et al. |
| 2016/0100587 | A1 | 4/2016 | Bywater-Ekegard et al. |
| 2018/0170819 | A1 | 6/2018 | West et al. |
| 2018/0213797 | A1 | 8/2018 | Spangenberg et al. |
| 2019/0153014 | A1 | 5/2019 | Choe et al. |
| 2020/0367493 | A1* | 11/2020 | Kolodkin-Gal ........ A01N 43/12 |
| 2022/0183291 | A1 | 6/2022 | Manohar et al. |
| 2022/0264876 | A1 | 8/2022 | Klessig et al. |
| 2024/0315186 | A1 | 9/2024 | Klessig et al. |

FOREIGN PATENT DOCUMENTS

WO WO-2014145380 A2 * 9/2014 ............... A01H 3/04

OTHER PUBLICATIONS

Montesinos, E. (2003). Plant-associated microorganisms: a view from the scope of microbiology. International Microbiology, 6, 221-223. (Year: 2003).*

Lakshmanan, et al., "Functional soil microbiome: belowground solutions to an aboveground problem" Plant Physiol. (2014) 166(2):689-700.

Kato, et al., "Time-series metagenomic analysis reveals robustness of soil microbiome against chemical disturbance" DNA Res. (2015) 22(6):413-24.

Gebremikael, et al., "Nematodes enhance plant growth and nutrient uptake under C and N-rich conditions" Sci. Rep. (2016):6:32862.

Knox, et al., "Effect of nematodes on rhizosphere colonization by seed-applied bacteria" Appl. Environ. Microbiol. (2004) 70(8):4666-71.

Panke-Buisse, et al., "Selection on soil microbiomes reveals reproducible impacts on plant function" ISME J. (2015) 9(4):980-9.

Lau, et al., "Rapid responses of soil microorganisms improve plant fitness in novel environments" Proc. Natl. Acad. Sci. (2012) 109(35):14058-62.

Mendes, et al., "Deciphering the rhizosphere microbiome for disease-suppressive bacteria" Science (2011) 332 (6033):1097-100.

Tu, et al., "Root-parasitic nematodes enhance soil microbial activities and nitrogen mineralization" Microb. Ecol. (2003) 46(1):134-44.

Neher, D.A., et al., "Role of nematodes in soil health and their use as indicators" J. Nematol. (2001) 33(4):161-8.

Manosalva, et al., "Conserved nematode signalling molecules elicit plant defenses and pathogen resistance" Nat. Commun. (2015) 6:7795.

Zhao, et al., "Ascarosides coordinate the dispersal of a plant-parasitic nematode with the metamorphosis of its vector beetle" Nat. Commun. (2016) 7:12341.

Bose, et al., "Complex small-molecule architectures regulate phenotypic plasticity in a nematode" Angew Chem Int Ed Engl. (2012) 51(50):12438-43.

Ludewig, et al., "Pheromone sensing regulates Caenorhabditis elegans lifespan and stress resistance via the deacetylase SIR-2.1" Proc Natl Acad Sci. (2013) 110(14):5522-7.

Pungaliya, et al., "A shortcut to identifying small molecule signals that regulate behavior and development in Caenorhabditis elegans" Proc Natl Acad Sci. (2009) 106(19):7708-13.

Lebeis, et al., "Plant Microbiome. Salicylic acid modulates colonization of the root microbiome by specific bacterial taxa" Science (2015) 349(6250):860-4.

* cited by examiner

*Primary Examiner* — Dale R Miller
(74) *Attorney, Agent, or Firm* — Robert C. Netter, Jr.; Dann, Dorfman, Herrell & Skillman

(57) ABSTRACT

Compositions and methods for modulating a microbiome are disclosed. In accordance with the instant invention, methods of modifying and/or modulating a microbiome (e.g., the composition of a microbiome) are provided. The methods of the instant invention comprise contacting the microbiome (e.g., the assemblage of organisms composing the microbiome) with a compound excreted by an organism (e.g., nematode), particularly an organism that naturally lives in or is part of the microbiome.

26 Claims, 1 Drawing Sheet

COMPOSITIONS AND METHODS FOR MODULATING MICROBIOMES

This application is a § 371 application of PCT/US2020/041128, filed Jul. 8, 2020, which claims priority under 35 U.S.C. § 119 (e) to U.S. Provisional Patent Application No. 62/871,478, filed Jul. 8, 2019. The foregoing applications are incorporated by reference herein.

This invention was made with government support under Grant No. 12217687 awarded by the National Institute of Food and Agriculture. The government has certain rights in the invention.

FIELD OF THE INVENTION

This invention relates to the field of agriculture. More specifically, the invention provides methods and compositions with utility in modulating microbiomes.

BACKGROUND OF THE INVENTION

Over the past decade, the microbiome and its impact on agro-ecosystems and human health has increasingly become the focus of scientific study and also received significant attention from the popular press (Lakshmanan, et al. (2014) Plant Physiol., 166:689-700; Kato, et al. (2015) DNA Res., 22:413-424). The microbial make-up of the soil is a primary determinant of plant health and disease resistance. For example, plant resistance against bacterial and fungal diseases is strongly affected by the microorganisms in the soil. Therefore, the ability to control the composition of the microbiome—to encourage growth of desirable microbes and/or suppress the growth of those that are undesirable—will enhance agricultural productivity by improving plant health, and by reducing dependence on pesticides and other chemical disease prevention strategies.

Microbiomes encompass a variety of beneficial and harmful organisms which exist in a dynamic system of networked interactions between the constituent organisms, whereby, interactions between diverse species in the microbiome can be remarkably coordinated (Mommer, et al. (2016) Trends Plant Sci., 21:209-217; Oburger, et al. (2016) Trends Plant Sci., 21:243-255; Venturi, et al. (2016) Trends Plant Sci., 21:187-198; Huang, et al. (2014) Botany 92:267-275). The composition of any microbiome continuously adapts its immediate environment (Venturi, et al. (2016) Trends Plant Sci., 21:187-198; Dessaux, et al. (2016) Trends Plant Sci., 21:266-278). The intra- or inter-specific interactions within a microbiome are presumed to be controlled predominantly by chemical signals that may originate from the participating microbes as well as (host) plants or animals, e.g. nematodes (Mommer, et al. (2016) Trends Plant Sci., 21:209-217; Huang, et al. (2014) Botany 92:267-275; Gebremikael, et al. (2016) Sci. Rep., 6:32862; Bjørnlund, et al. (2012) Eur. J. Soil Biol., 50:28-31; Knox, et al. (2004) Appl. Environ. Microbiol., 70:4666-4671; van Dam, et al. (2016) Trends Plant Sci., 21:256-265). However, the chemical structures of the signals as well as the underlying signaling mechanisms remain largely unknown. Recent studies provide conclusive evidence that plants and animals can actively regulate the composition of the microbiome (Venturi, et al. (2016) Trends Plant Sci., 21:187-198; Gebremikael, et al. (2016) Sci. Rep., 6:32862; Panke-Buisse, et al. (2015) ISME J., 9:980-9; Bainard, et al. (2013) Plant Soil 363:345-356; Lau, et al. (2012) Proc. Natl. Acad. Sci., 109:14058-14062; Mendes, et al. (2011) Science 332:1097-1100; Swenson, et al. (2000) Proc. Natl. Acad. Sci., 97:9110-4). Identifying the small molecules and related signaling mechanisms employed by plants and animals to modulate microbiomes will open valuable new avenues to develop products to improve agricultural production and human health.

SUMMARY OF THE INVENTION

In accordance with the instant invention, methods of modifying and/or modulating a microbiome (e.g., the composition of a microbiome) are provided. The methods of the instant invention comprise contacting the microbiome (e.g., the assemblage of organisms composing the microbiome) with a compound excreted by an organism (e.g., nematode), particularly an organism that naturally lives in or is part of the microbiome. In a particular embodiment, the compound is a small molecule identical to a compound (e.g., signaling molecule) excreted by an organism that lives in such microbiomes. In a particular embodiment, the compound is delivered to the microbiome as part of a composition. In a particular embodiment, the compound is an ascaroside (e.g., ascr #3, ascr #9, ascr #10, or ascr #18, particularly ascr #18).

In certain embodiments, the modification of the microbiome comprises modifying the growth of one or more bacterial species present in the microbiome (e.g., relative to a control not treated with the compound). For example, the growth rate of a bacterial species may be increased or enhanced; the growth rate of a bacterial species may be reduced or inhibited; the morphology of a colony formed by the bacterial species may be modified; the physiology of the bacterial species may be modified; or a biofilm formed by the bacterial species may be modified (e.g., reduced/inhibited or increased/enhanced).

In certain embodiments, the modification of the microbiome comprises modifying the growth of one or more fungal species present in the microbiome (e.g., relative to a control not treated with the compound). For example, the growth rate of a fungal species may be increased or enhanced; the growth rate of a fungal species may be reduced or inhibited; the morphology of a colony or structure formed by the fungal species may be modified; or the physiology of the fungal species may be modified.

In certain embodiments, the modification comprises modifying the relative abundance of two or more species (e.g., bacteria and/or fungi) present in the microbiome (e.g., relative to a control not treated with the compound). In certain embodiments, the modification comprises increasing the relative abundance of one or more species beneficial to the health of a target organism in contact with the modified microbiome. In certain embodiments, the modification comprises decreasing the relative abundance of one or more species detrimental to the health of a target organism in contact with the modified microbiome. In certain embodiments, the microbiome is one in contact with a plant. For example, the plant microbiome may comprise endophytes and/or rhyzophytes.

In accordance with another aspect of the instant invention, methods of enhancing the growth of a plant (e.g., a crop plant) are provided. The methods comprise contacting a soil in contact with the plant with a compound of the instant invention, wherein the enhanced growth of the plant is due to effects of the compound on the soil microbiome (e.g., the growth of microorganisms present in in the soil).

In certain embodiments, the modification of the microbiome comprises modifying the growth of one or more bacterial species present in the microbiome (e.g., relative to a control not treated with the compound). For example, the growth rate of a bacterial species may be increased or enhanced; the growth rate of a bacterial species may be reduced or inhibited; the morphology of a colony formed by the bacterial species may be modified; the physiology of the bacterial species may be modified; or the biofilm formation by the bacterial species is modified (e.g., reduced/inhibited or increased/enhanced). In a particular embodiment, the methods comprise reducing or inhibiting biofilm formation and/or growth.

In certain embodiments, the modification of the microbiome comprises modifying the growth of one or more fungal species present in the microbiome (e.g., relative to a control not treated with the compound). For example, the growth rate of a fungal species may be increased or enhanced; the growth rate of a fungal species may be reduced or inhibited; the morphology of a colony or structure formed by the fungal species may be modified; or the physiology of the fungal species may be modified.

In certain embodiments, the modification comprises modifying the relative abundance of two or more species (e.g., bacteria and/or fungi) present in the microbiome (e.g., relative to a control not treated with the compound). In certain embodiments, the modification comprises increasing the relative abundance of one or more species beneficial to the health of the plant in contact with the modified microbiome. In certain embodiments, the modification comprises decreasing the relative abundance of one or more species detrimental to the health of the plant in contact with the modified microbiome.

DETAILED DESCRIPTION OF THE INVENTION

Figure 1A:
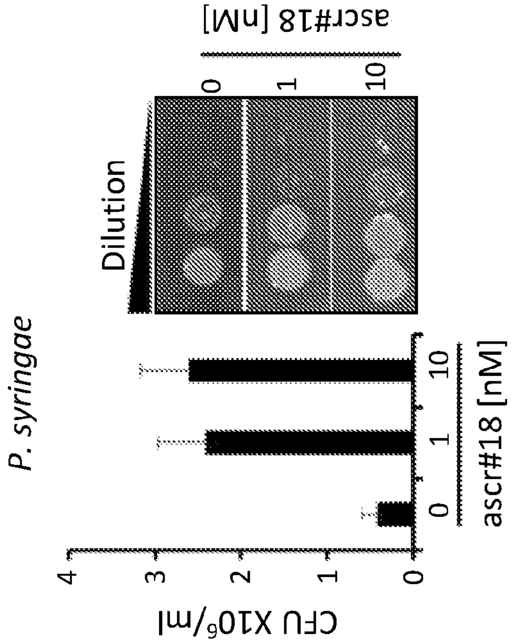
FIG. 1A provides a graph and images of *P. syringae* growth. Bacterial growth media were supplemented with different concentrations of ascarosides. Ten-fold serially diluted bacterial cells were plated and bacterial growth and quantification was performed 3 days post incubation.

Any ecosystem holds enormous microbial diversity and since most of these microbes cannot be cultured under standard laboratory conditions, metagenomics-based, high-throughput DNA sequencing of conserved microbial genes has emerged as a powerful tool to determine diversity, abundance, and fluctuations in the soil microbiome. These approaches can be used to delineate ascaroside-mediated chemical signaling in complex ecosystems such as soil or animal-associated niches (e.g. in the human gut). In agriculture, tailored microbiomes can improve crop growth, nutrient utilization, and benefit plant disease resistance. Similarly, the ability to modulate livestock- or human-associated microbiomes can be therapeutic for a variety of livestock or human diseases including, for example, microbial infections to immune disorders. Indeed, it is well established that gut microbiome composition plays a central role for overall fitness, from susceptibility to microbial infections to the likelihood of death from cancer (Zitvogel, et al. (2017) Nat. Rev. Microbiol., 15:465-478). Examples of microbiome associated diseases and disorders include, without limitation, acne, antibiotic-associated diarrhea, asthma/allergies, autoimmune diseases, cancer, dental cavities, eczema, gastric ulcers, and inflammatory bowel disease. Furthermore, ascaroside modulation of biofilm formation allows for the treatment of microbial infections.

The results presented herein indicate that ascarosides have profound effects on bacterial growth and the biomass of biofilms. These effects are observed both with beneficial as well as pathogenic bacteria from soil and human microbiomes. Examples of such bacteria include, without limitation, *Bacillus megaterium, Lactobacillus* spp., *Bifidobacterium* spp., *Yersinia pseudotuberculosis, Vibrio cholerae*, and *Burkholderia cepacian* (Khan, et al. (2018) Microbiol. Res., 215:102-113). Fungi are also important components of both soil and human microbiomes and hugely impact plant and animal (Sam, et al. (2017) Intl. J. Mol. Sci., 18(2):330; Mendes, et al. (2013) FEMS Microbiol. Rev., 37:634-663). Ascaroside metabolism by fungi is similar to that of plants and animals. Examples of fungi with agrochemical and clinical significance include, without limitation, *Saccharomyces* spp., *Aspergillus* spp., *Crytococcus* spp., *Candida albicans, Trichosporon asahii, Pneumocystis jirovecii, Fusarium* spp., *Trichosporon asahii*, and *Pneumocystis jirovecii* (Walsh, et al. (2004) Clin. Microbiol. Infect., 10:48-66).

In accordance with the instant invention, methods for modulating a microbiome (e.g., modifying or modulating the composition of a microbiome) are provided (e.g., as evidenced by promotion, enhancement, and/or increased plant growth compared to untreated controls). In a particular embodiment, the method comprises contacting an assemblage of organisms composing the microbiome with a composition containing a compound (e.g., a small molecule) identical to a signaling molecule produced and/or excreted by an organism (e.g., an organism that lives in such microbiomes or is naturally found in such microbiomes). The term "microbiome" can refer to the totality of microbes (bacteria, fungi, nematodes, arthropods) in a defined environment. In a particular embodiment, the microbiome is a soil microbiome (e.g., the immediate environment of a plant such as within the area of soil containing the root system of the plant or the plant seed). In a particular embodiment, the microbiome is a gut or intestinal microbiome (e.g., within an animal, particularly a mammal, particularly a human).

With regard to the above methods, the compound produced by the organism may be a foreign (non-self) molecule or macromolecule to the plant being treated. Typically, the organism-produced compound is one that is secreted by the organism. In a particular embodiment, the organism-produced compound is a small molecule. The organism-produced compound applied according to the methods herein may be chemically synthesized, produced by fermentation, and/or isolated from the organism or a related organism (e.g., from a culture of the organism or a related organism).

In a particular embodiment, the organism-produced compound comprises the formula:

$$G\text{-}Lp\text{-}(C{=}O)\text{—}XR,$$

wherein G represents a moiety selected from a sugar, an amino acid, a nucleic acid, a combination of two or more of these, and a derivative of any of these; Lp represents an optionally unsaturated chain comprising n carbon atoms, wherein n is an integer from 4 to 40 inclusive (e.g., a fatty acid-like side chain); X represents O or $NR^y$ (particularly O); R is selected from —H, a metal ion, an optionally substituted moiety selected from $C_{1-12}$ aliphatic, $C_{1-12}$ heteroaliphatic, aromatic, heteroaromatic, and -G-Lp-(C═O)—XR (e.g., a dimer or oligomer); and $R^y$ is —H or an optionally substituted moiety selected from $C_{1-12}$ aliphatic, $C_{1-12}$ heteroaliphatic, aromatic, and heteroaromatic.

In a particular embodiment, G is an amino acid, a peptide, or a derivative thereof. In a particular embodiment, G is a sugar. In a particular embodiment, G is a sugar linked to Lp via a glycosidic bond. In a particular embodiment, G is a deoxy sugar, ascarylose, rhamnose,

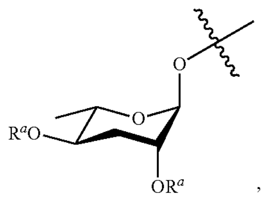
, or a derivative thereof. In a particular embodiment, G has the formula where each $R^a$ is independently selected from H, alkyl, acyl, a glycoside, a peptide, or a nucleoside, particularly H. In a particular embodiment, G is ascarylose.

In a particular embodiment, R is a $C_{1-6}$ aliphatic. In a particular embodiment, R is H.

In a particular embodiment, Lp is an optionally substituted saturated or unsaturated carbon chain (e.g., aliphatic chain). In a particular embodiment, Lp is an optionally substituted saturated or unsaturated chain containing 4 to 40 carbon atoms in its main chain (e.g., excluding any carbon atoms present on methyl or other groups branching from the main linear chain). In a particular embodiment, Lp is an optionally substituted, saturated or unsaturated chain containing 4 to 6, 4 to 8, 6 to 10, 6 to 12, 8 to 16, 10 to 20, 12 to 24, 16 to 24, or 20 to 32 carbon atoms in its main chain. In a particular embodiment, Lp is an optionally substituted, saturated or unsaturated chain containing more than 8, more than 10, more than 12, more than 14, more than 18, or more than 24 carbon atoms in its main chain.

In a particular embodiment, Lp is an optionally substituted, saturated chain. In certain embodiments, Lp is an optionally substituted, saturated lipid containing 4 to 40 carbon atoms. In a particular embodiment, Lp is a saturated, optionally substituted chain containing 4 to 6, 4 to 8, 6 to 10, 6 to 12, 8 to 16, 10 to 20, 12 to 24, 16 to 24, or 20 to 32 carbon atoms in its main chain.

In a particular embodiment, Lp is a mono- or polyunsaturated, optionally substituted chain. In certain embodiments, Lp is a mono- or polyunsaturated, optionally substituted chain comprising 4 to 40 carbon atoms in its main chain. In certain embodiments, Lp is a mono-unsaturated, optionally substituted chain containing 4 to 6, 4 to 8, 6 to 10, 6 to 12, 8 to 16, 10 to 20, 12 to 24, 16 to 24, or 20 to 32 carbon atoms in its main chain. In certain embodiments, Lp is a polyunsaturated, optionally-substituted chain containing 4 to 6, 4 to 8, 6 to 10, 6 to 12, 8 to 16, 10 to 20, 12 to 24, 16 to 24, or 20 to 32 carbon atoms in its main chain. In certain embodiments, Lp is a mono-unsaturated, optionally-substituted chain containing 4 to 6, 4 to 8, 6 to 10, 6 to 12, 8 to 16, 10 to 20, 12 to 24, 16 to 24, or 20 to 32 carbon atoms in its main chain.

In certain embodiments, Lp is a chain substituted at the carbon attached to G. In certain embodiments, Lp is a chain bearing a $C_{1-12}$ optionally substituted aliphatic group on the carbon atom attached to G. In certain embodiments, Lp is a chain bearing a $C_{1-8}$, a $C_{1-6}$, a $C_{1-4}$, or a $C_{1-3}$ optionally substituted aliphatic group on the carbon atom attached to G. In certain embodiments, Lp is a chain bearing an aliphatic moiety selected from the group of methyl, ethyl, n-propyl, i-propyl, n-butyl, sec-butyl, vinyl, allyl, ethynyl, or propargyl on the carbon atom attached to G. In a particular embodiment, Lp has the formula $—CHCH_3(CH_2)_y—$, wherein y is an integer from 3 to 39. In a particular embodiment, Lp has the formula $—CHCH_3(CH_2)_y—$, wherein y is an integer from 3 to 6, from 4 to 8, from 6 to 10, from 6 to 12, from 8 to 16, from 10 to 20, from 12 to 24, from 16 to 24, or from 20 to 32 carbon atoms in its main chain. In a particular embodiment, Lp has the formula $—CHCH_3(CH_2)_8—$. In a particular embodiment, Lp has the formula $—CHCH_3(CH_2)_9—$. In a particular embodiment, Lp has the formula $—CHCH_3(CH_2)_{10}—$. In a particular embodiment, Lp has the formula $—CHCH_3(CH_2)_{12}—$. In a particular embodiment, Lp has the formula $—CHCH_3(CH_2)_7—$. In a particular embodiment, Lp has the formula $—CHCH_3(CH_2)_6—$ and X is O. In a particular embodiment, Lp has the formula $—CHCH_3(CH_2)_8—$; X is O; and R is H.

In certain embodiments, Lp is a chain having geminal disubstitution on the carbon atom attached to G. In certain embodiments, Lp has a formula $—C(CH_3)_2(CH_2)_y—$, where y is as defined in the embodiments and examples herein.

In a particular embodiment, Lp is an unsaturated chain. In certain embodiments, Lp is an unsaturated chain having 1 to 3 sites of unsaturation. In certain embodiments, Lp is a mono-unsaturated chain. In certain embodiments, Lp has the formula $—CHCH_3(CH_2)_a—CH═CH—(CH_2)_b—$, wherein a and b are independently integers from 0 to 20 and the sum of a and b is 2 to 30. In a particular embodiment, Lp has the formula $—CHCH_3(CH_2)_zCH═CH—$, where z is an integer from 1 to 18. In a particular embodiment, Lp has the formula $—CHCH_3(CH_2)_zCH═CH—$, where z is an integer from 1 to 4, from 4 to 6, from 6 to 8, from 4 to 12, from 6 to 12, from 10 to 20, from 12 to 24, or from 16 to 24. In a particular embodiment, Lp has the formula $—CHCH_3(CH_2)_2CH═CH—$. In a particular embodiment, Lp has the formula $—CHCH_3(CH_2)_3CH═CH—$. In a particular embodiment, Lp has the formula $—CHCH_3(CH_2)_4CH═CH—$. In a particular embodiment, Lp has the formula $—CHCH_3(CH_2)_5CH═CH—$. In a particular embodiment, Lp has the formula $—CHCH_3(CH_2)_6CH═CH—$. In a particular embodiment, Lp has the formula $—CHCH_3(CH_2)_2CH═CH—$ and X is O. In a particular embodiment, Lp has the formula $—CHCH_3(CH_2)_2CH═CH—$; X is O; and R is H. In a particular embodiment, Lp has the formula $—CHCH_3(CH_2)_4CH═CH—$ and X is O. In a particular embodiment, Lp has the formula $—CHCH_3(CH_2)_4CH═CH—$; X is O; and R is H.

In certain embodiments where Lp conforms to a formula with a substructure $—CHCH_3CH_2$ . . . , the chiral center (e.g. the underlined carbon atom in the substructure) is enantio-enriched. In certain embodiments, the chiral center is substantially enantiopure. In certain embodiments, the chiral center has the R configuration. In certain embodiments, the chiral center has the S configuration. In certain embodiments, the chiral center is present as a racemic (or diastereomeric) mixture.

In a particular embodiment, the organism-produced compound is an ascaroside. Examples of ascarosides suitable for the present invention include, but are not limited to:

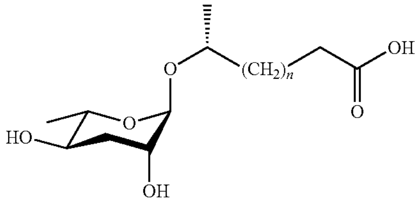
n = 6, ascr#16
n = 7, ascr#18
n = 8, ascr#20
n = 9, ascr#22
n = 10, ascr#24
n = 11, ascr#26
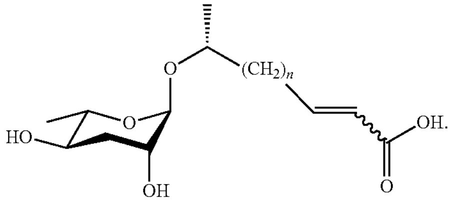
n = 5, ascr#15
n = 6, ascr#17
n = 7, ascr#19
n = 8, ascr#21
n = 9, ascr#23
n = 10, ascr#25
Further examples of ascarosides suitable for the present invention include, without limitation:
ascr#10
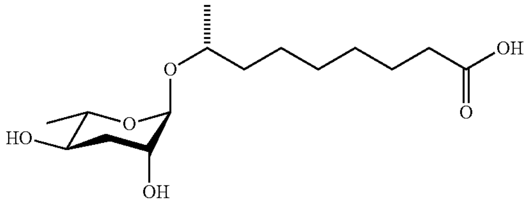
ascr#3
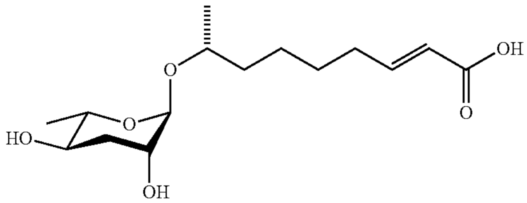
ascr#7
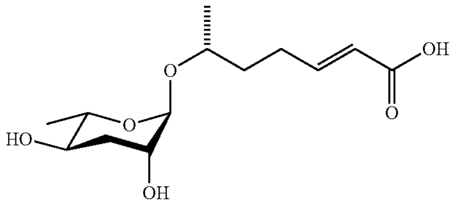
-continued
ascr#1
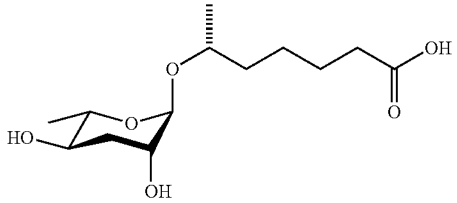
icas#9
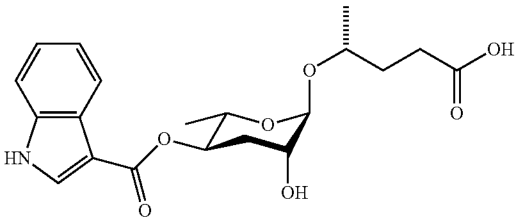
ascr#8
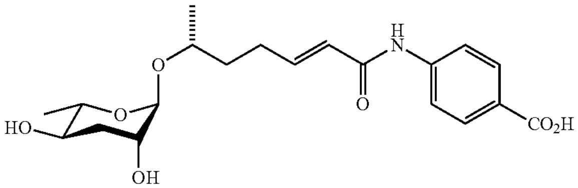
oscr#10
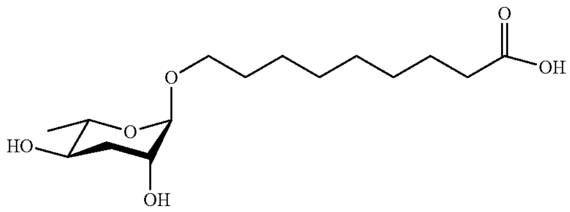
ascr#9
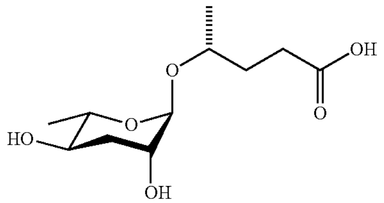
mbas#3
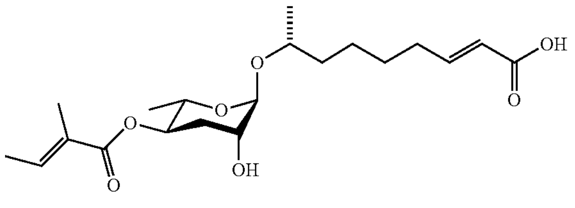
ascr#2
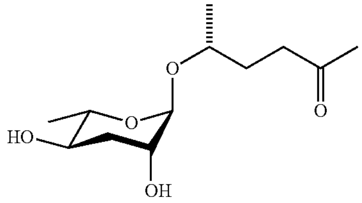

-continued ascr#4

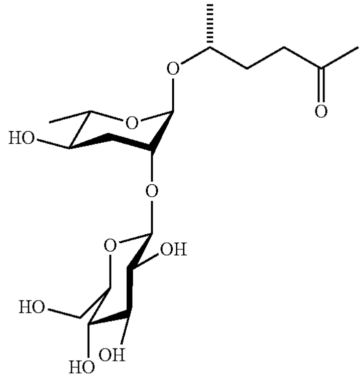

bhas#18

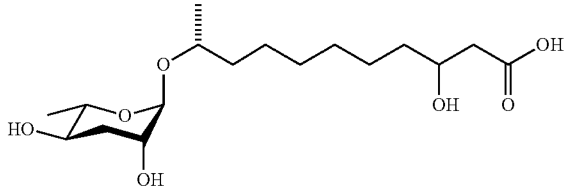

ascr#5

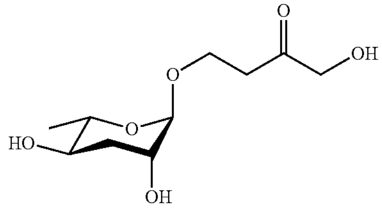

hbas#3

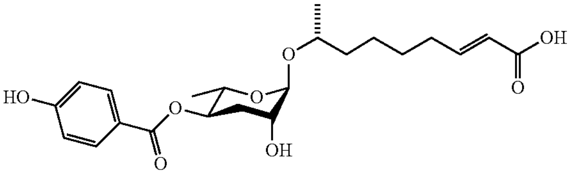

easc#18

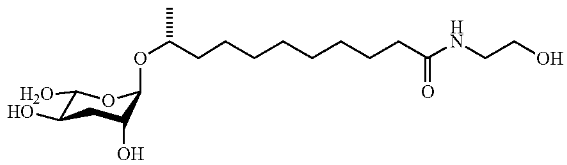

oscr#9

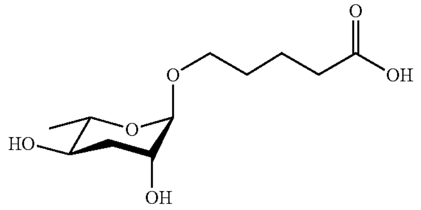

and

-continued oscr#16

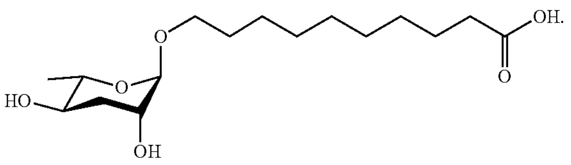

The instant invention also contemplates formulations and methods utilizing compounds that are structurally identical to the ascarosides depicted above except that the number of carbon atoms in the fatty acid-like side chain is changed (e.g., from between 3 and 32 carbons). Likewise, the instant invention encompasses compounds that are structurally identical to the ascarosides depicted above except that the identity of the substituents on the ascarylose oxygen atoms (e.g., on the hydroxyl groups at the 2- and 4-positions of the sugar) is changed. The instant invention also encompasses compounds that are structurally identical to the ascarosides depicted above except that the stereochemistry of one or more chiral centers is different (e.g., enantiomers, diastereomers or racemates of the depicted compounds). The instant invention also encompasses compounds that are structurally identical to the ascarosides depicted above except for the degree or pattern of deoxygenation of the sugar (e.g., compounds where one or both of the 3- and 6-positions of the sugar are not deoxygenated, and/or compounds where one or both of the 2- and 4-positions are deoxygenated). The instant invention also encompasses compounds that are structurally identical to the ascarosides depicted above except that the stereochemistry of one or more chiral centers is different (e.g., enantiomers, diastereomers or racemates of the depicted compounds). The instant invention also encompasses compounds that are structurally identical to the ascarosides depicted above except that the oxygen atom in the sugar ring is replaced by a carbon or nitrogen atom (e.g. replaced by —$C(R^y)_2$— or by —$NR^y$—, where each Ry is independently as defined above and in the genera and subgenera herein).

In a particular embodiment, the organism-produced compound comprises ascr #18. In a particular embodiment, the organism-produced compound is a side-chain shortened metabolite or analog of ascr #18 (e.g., ascr #10, ascr #1, ascr #9). In a particular embodiment, the organism-produced compound is a terminally substituted metabolite or analog of ascr #18 (e.g., oscr #10, oscr #16, etc.). In a particular embodiment, the organism-produced compound is ascr #10, ascr #1, ascr #9, ascr #3, or ascr #18. In a particular embodiment, the organism-produced compound is ascr #10, ascr #9, ascr #3, or ascr #18. In a particular embodiment, the organism-produced compound is oscr #10, or oscr #16. In a particular embodiment, the organism-produced compound is a derivative of ascr #18. In a particular embodiment, the organism-produced compound is an unsaturated analog of an ascaroside, e.g. a sidechain unsaturated analog of ascr #10, ascr #1, ascr #9, ascr #3, or ascr #18). In certain embodiments, such derivatives comprise modification of the ascarylose. In certain embodiments, such derivatives comprise esters, thioesters, or amides of the fatty acid sidechain. In certain embodiments, such derivatives comprise dimers, trimers, oligomers or polymers of as ascaroside, (e.g. a dimer, trimer, oligomer, or polymer of ascr #10, ascr #1, ascr #9, ascr #3, ascr #18, or their derivatives).

As stated hereinabove, the methods of the instant invention comprise contacting the microbiome with an organism-produced compound (e.g., ascaroside). The compounds of the instant invention may be administered to any part of the microbiome. For example, the compounds of the instant invention may be administered to the organisms contained within the microbiome. In a particular embodiment, the compounds of the instant invention are administered to the soil comprising the microbiome. In a particular embodiment, the compounds of the instant invention are administered to a plant that is in contact with the soil comprising the microbiome. In a particular embodiment, the compounds of the instant invention are administered to a subject (e.g., an animal) comprising the microbiome (e.g., for therapeutic purposes).

The treatment of microbiomes and/or soil with the compounds and formulations described herein may be carried out directly or by allowing the compounds to act on the surroundings, environment or storage space by the customary treatment methods, for example by immersion, spraying, evaporation, fogging, scattering, painting on and, in the case of propagation material, in particular in the case of seeds, also by applying one or more coats. In a particular embodiment, the compounds of the instant invention are administered to the soil by drenching the locus of the microbiome with a liquid preparation or by incorporating the compounds into the soil in solid form, e.g., in the form of granules comprising the compounds with carriers (soil application). In a particular embodiment, the compounds of the instant invention are administered to plants in contact with the soil by foliar spray or fogging with a liquid preparation or by incorporating the compounds into a solid form applied to the plants, e.g., in the form of a powder.

The compounds of the instant invention may be used alone or contained in a composition with a carrier. For example, the compounds described herein may be formulated together with an agronomically acceptable carrier. The term "agronomically acceptable carrier" includes any carrier suitable for administration to a plant or soil. For example, customary excipients in formulation techniques, such as solutions (e.g., directly sprayable or dilutable solutions), aqueous solutions, emulsions, (e.g., emulsion concentrates and diluted emulsions), wettable powders, suspensions, soluble powders, powders, dusts, pastes, soluble powders, granules, suspension-emulsion concentrates, encapsulation into polymeric materials, coatable pastes, natural and synthetic materials impregnated with active compound and microencapsulations in polymeric substances. These formulations are produced in a known manner, for example by mixing the compounds with agronomically acceptable carrier, such as liquid solvents or solid carriers, optionally with the use of surfactants, including emulsifiers, dispersants, and/foam-formers. In a particularly embodiment, the agronomically acceptable carrier is synthetic or nan-natural.

If the agronomically acceptable carrier is water, the composition may also comprise auxiliary solvents such as organic solvents. Suitable liquid solvents include, for example, aromatics (e.g., xylene, toluene and alkylnaphthalenes); chlorinated aromatics or chlorinated aliphatic hydrocarbons (e.g., chlorobenzenes, chloroethylenes and methylene chloride); aliphatic hydrocarbons (e.g., cyclohexane); paraffins (e.g., petroleum fractions, mineral and vegetable oils); alcohols (e.g., butanol or glycol and also their ethers and esters); ketones (e.g., acetone, methyl ethyl ketone, methyl isobutyl ketone and cyclohexanone) and strongly polar solvents (e.g., dimethylformamide and dimethyl sulphoxide). It is preferred that nontoxic carriers be used in the methods of the present invention.

Suitable solid agronomically acceptable carriers include, for example, ammonium salts and ground natural minerals (e.g., kaolins, clays, talc, chalk, quartz, attapulgite, montmorillonite and diatomaceous earth); ground synthetic minerals (e.g., highly disperse silica, alumina and silicates); crushed and fractionated natural rocks (e.g., calcite, marble, pumice, sepiolite and dolomite); synthetic granules of inorganic and organic meals; and granules of organic material (e.g., sawdust, coconut shells, maize cobs, and tobacco stalks).

Suitable emulsifiers and foam-formers include, for example, nonionic and anionic emulsifiers (e.g., polyoxyethylene fatty acid esters, polyoxyethylene fatty alcohol ethers, for example, alkylaryl polyglycol ethers, alkylsulphonates, alkyl sulphates and arylsulphonates) and protein hydrolysates.

Suitable dispersants include, for example, lignin-sulphite waste liquors and methylcellulose.

Tackifiers such as carboxymethylcellulose and natural and synthetic polymers in the form of powders, granules or latices, such as gum arabic, polyvinyl alcohol and polyvinyl acetate, as well as natural phospholipids, such as cephalins and lecithins, and synthetic phospholipids, can be also used in the formulations. Other additives may include, for example, mineral and vegetable oils.

Colorants such as inorganic pigments, for example, iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc may also be included in the agronomically acceptable carrier.

The compounds or compositions of the instant invention may be administered to the microbiome and/or soil by any techniques known in the art, including, for example, spraying, atomizing, dusting, scattering, coating or pouring. One of skill in the art would be able to determine the appropriate technique for administration without undue experimentation according to the specific chemical composition and formulation of the compound being employed, the method of applying the compound/formulation, and the locus of treatment.

The compositions disclosed herein generally comprise between 0.001 and 95% by weight of active compound(s), particularly between 0.001 and 1%. Favorable application rates are, in general, 0.001 g to 1,000 g of active substance(s) (AS) per hectare (ha), for example, 0.001 g to 0.01 g AS/ha, 0.01 g to 0.1 g AS/ha, 0.1 g to 0.5 g AS/ha, 0.5 g to 1 g AS/ha, 1 g to 5 g AS/ha, 5 g to 25 g AS/ha, 25 g to 100 g AS/ha, 100 to 500 g AS/ha, or 500 to 1,000 g AS/ha. For application of tubers or seed grain, dosages of 0.001 mg to 1,000 mg active substance per kg of seed grain or tubers may be used, for example or 0.001 to 0.01 mg/kg, 0.01 to 0.05 mg/kg, 0.05 to 0.1 mg/kg, 0.1 to 0.5 mg/kg, 0.5 to 1 mg/kg, 1 to 5 mg/kg, 5 to 10 mg/kg, 10 to 50 mg/kg, 50 to 500 mg/kg, or 500 to 1,000 mg/kg.

As explained hereinabove, methods of treating, inhibiting, and/or preventing a disease or disorder associated with a microbiome in a subject are also provided. Examples of microbiome associated diseases and disorders include, without limitation, acne, antibiotic-associated diarrhea, asthma/allergies, autoimmune diseases, cancer, dental cavities, eczema, gastric ulcers, and inflammatory bowel disease. The methods comprise administering a therapeutically effective amount of the compound to a subject in need thereof. The dosages, methods, and times of administration are readily determinable by persons skilled in the art, given the teachings provided herein.

The compounds as described herein will generally be administered to a patient as a pharmaceutical preparation (e.g., with a pharmaceutically acceptable carrier). The term "patient" or "subject" as used herein refers to human or animal subjects. The compounds of the instant invention may be employed therapeutically, under the guidance of a physician for the treatment of the indicated disease or disorder.

The pharmaceutical preparation comprising the compounds of the invention may be conveniently formulated for administration with an acceptable medium (e.g., pharmaceutically acceptable carrier) such as water, buffered saline, ethanol, polyol (for example, glycerol, propylene glycol, liquid polyethylene glycol and the like), dimethyl sulfoxide (DMSO), oils, detergents, suspending agents or suitable mixtures thereof. The concentration of the agents in the chosen medium may be varied and the medium may be chosen based on the desired route of administration of the pharmaceutical preparation. Except insofar as any conventional media or agent is incompatible with the agents to be administered, its use in the pharmaceutical preparation is contemplated.

The compositions of the present invention can be administered by any suitable route, for example, by injection (e.g., for local (direct) or systemic administration), oral, pulmonary, topical, nasal or other modes of administration. The composition may be administered by any suitable means, including parenteral, intramuscular, intravenous, intraarterial, intraperitoneal, subcutaneous, topical, inhalatory, transdermal, intrapulmonary, intraareterial, intrarectal, intramuscular, and intranasal administration. In a particular embodiment, the composition is administered directly to the microbiome. In general, the pharmaceutically acceptable carrier of the composition is selected from the group of diluents, preservatives, solubilizers, emulsifiers, adjuvants and/or carriers. The compositions can include diluents of various buffer content (e.g., Tris HCl, acetate, phosphate), pH and ionic strength; and additives such as detergents and solubilizing agents (e.g., polysorbate 80), anti oxidants (e.g., ascorbic acid, sodium metabisulfite), preservatives (e.g., Thimersol, benzyl alcohol) and bulking substances (e.g., lactose, mannitol). The compositions can also be incorporated into particulate preparations of polymeric compounds such as polyesters, polyamino acids, hydrogels, polylactide/glycolide copolymers, ethylenevinylacetate copolymers, polylactic acid, polyglycolic acid, etc., or into liposomes. Such compositions may influence the physical state, stability, rate of in vivo release, and rate of in vivo clearance of components of a pharmaceutical composition of the present invention. See, e.g., Remington: The Science and Practice of Pharmacy, 21st edition, Philadelphia, PA. Lippincott Williams & Wilkins. The pharmaceutical composition of the present invention can be prepared, for example, in liquid form, or can be in dried powder form (e.g., lyophilized for later reconstitution).

As used herein, "pharmaceutically acceptable carrier" includes any and all solvents, dispersion media and the like which may be appropriate for the desired route of administration of the pharmaceutical preparation, as exemplified in the preceding paragraph. The use of such media for pharmaceutically active substances is known in the art. Except insofar as any conventional media or agent is incompatible with the molecules to be administered, its use in the pharmaceutical preparation is contemplated.

Pharmaceutical compositions containing a compound of the present invention as the active ingredient in intimate admixture with a pharmaceutical carrier can be prepared according to conventional pharmaceutical compounding techniques. The carrier may take a wide variety of forms depending on the form of preparation desired for administration, e.g., intravenous. Injectable suspensions may be prepared, in which case appropriate liquid carriers, suspending agents and the like may be employed. Pharmaceutical preparations for injection are known in the art. If injection is selected as a method for administering the therapy, steps should be taken to ensure that sufficient amounts of the molecules reach their target cells to exert a biological effect.

A pharmaceutical preparation of the invention may be formulated in dosage unit form for ease of administration and uniformity of dosage. Dosage unit form, as used herein, refers to a physically discrete unit of the pharmaceutical preparation appropriate for the patient undergoing treatment. Each dosage should contain a quantity of active ingredient calculated to produce the desired effect in association with the selected pharmaceutical carrier. Procedures for determining the appropriate dosage unit are well known to those skilled in the art. Dosage units may be proportionately increased or decreased based on the weight of the patient. Appropriate concentrations for alleviation of a particular pathological condition may be determined by dosage concentration curve calculations, as known in the art. The appropriate dosage unit for the administration of the molecules of the instant invention may be determined by evaluating the toxicity of the molecules in animal models. Various concentrations of pharmaceutical preparations may be administered to mice with transplanted human tumors, and the minimal and maximal dosages may be determined based on the results of significant reduction of tumor size and side effects as a result of the treatment. Appropriate dosage unit may also be determined by assessing the efficacy of the treatment in combination with other standard therapies.

The pharmaceutical preparation comprising the compounds of the instant invention may be administered at appropriate intervals, for example, at least twice a day or more until the pathological symptoms are reduced or alleviated, after which the dosage may be reduced to a maintenance level. The appropriate interval in a particular case would normally depend on the condition of the patient.

Definitions

The following definitions are provided to facilitate an understanding of the present invention.

The singular forms "a," "an," and "the" include plural referents unless the context clearly dictates otherwise.

The term "ascaroside" refers to any of a group of glycolipids, containing the sugar ascarylose, found in nematodes.

The term "pathogen" refers to any bacterium, fungus, oomecyte, virus, nematode (e.g., cyst or root knot nematode), or insect, with pathogenic effects on the plant.

The term "substantially pure" refers to a preparation comprising at least 50-60% by weight of a given material (e.g., small molecule, nucleic acid, oligonucleotide, protein, etc.). More preferably, the preparation comprises at least 75% by weight, and most preferably 90-95% by weight of the given compound. Purity is measured by methods appropriate for the given compound (e.g. chromatographic methods, agarose or polyacrylamide gel electrophoresis, HPLC-MS analysis, and the like).

A "carrier" refers to, for example, a diluent, adjuvant, preservative (e.g., Thimersol, benzyl alcohol), anti-oxidant (e.g., ascorbic acid, sodium metabisulfite), solubilizer (e.g., polysorbate 80), emulsifier, buffer (e.g., Tris HCl, acetate, phosphate), antimicrobial, bulking substance (e.g., lactose, mannitol), excipient, auxiliary agent or vehicle with which an active agent of the present invention is administered. Carriers can be sterile liquids, such as water and oils, including those of petroleum, animal, vegetable or synthetic origin. Water or aqueous saline solutions and aqueous dextrose and glycerol solutions can be employed as carriers.

As used herein, the term "small molecule" refers to a substance or compound that has a relatively low molecular weight (e.g., less than 4,000, less than 2,000, particularly less than 1 kDa or 800 Da). Typically, small molecules are organic.

The term "aliphatic" refers to a non-aromatic hydrocarbon-based moiety. Aliphatic compounds can be acyclic (e.g., linear or branched) or cyclic moieties (e.g., cycloalkyl) and can be saturated or unsaturated (e.g., alkyl, alkenyl, and alkynyl). Aliphatic compounds may comprise a mostly carbon main chain (e.g., 1 to about 30 carbons) and comprise heteroatoms and/or substituents (see below). The term "alkyl," as employed herein, includes saturated or unsaturated, straight or branched chain hydrocarbons containing 1 to about 30 carbons in the normal/main chain, particularly 24 or fewer carbon atoms (e.g., methyl, ethyl, n-propyl, ipropyl, n-butyl, s-butyl, t-butyl, n-pentyl, i-pentyl, n-hexyl, and the like). Branched alkyl means that one or more lower alkyl groups such as methyl, ethyl, or propyl are attached to a linear alkyl chain. The hydrocarbon chain of the alkyl groups may be interrupted with one or more heteroatom (e.g., oxygen, nitrogen, or sulfur). An alkyl (or aliphatic) may, optionally, be substituted (e.g. with fewer than about 8, fewer than about 6, or 1 to about 4 substituents). The term "lower alkyl" or "lower aliphatic" refers to an alkyl or aliphatic, respectively, which contains 1 to 3 carbons in the hydrocarbon chain. Alkyl or aliphatic substituents include, without limitation, alkyl (e.g., lower alkyl), alkenyl, halo (such as F, Cl, Br, I), haloalkyl (e.g., $CCl_3$ or $CF_3$), alkoxyl, alkylthio, hydroxy, methoxy, carboxyl, oxo, epoxy, alkyloxycarbonyl, alkylcarbonyloxy, amino, carbamoyl (e.g., $NH_2C({=}O){-}$ or $NHRC({=}O){-}$, wherein R is an alkyl), urea ($-NHCONH_2$), alkylurea, aryl, ether, ester, thioester, nitrile, nitro, amide, carbonyl, carboxylate and thiol.

"Alkenyl" means an alkyl, as defined above, containing at least one double bond between adjacent carbon atoms. Alkenyls include both cis and trans isomers. Branched alkenyl means that one or more lower alkyl groups such as methyl, ethyl, or propyl are attached to a linear alkenyl chain.

The term "halogen" refers to fluoro, chloro, bromo, and iodo. The term "halo alkyl" refers to a branched or straight-chain alkyl as described above, substituted with one or more halogens.

The term "acyl" refers to a group of general formula —C(O)R, wherein R is an aliphatic or alkyl. In a particular embodiment, the term "acyl" refers to groups of from 1 to 8 carbon atoms of a straight, branched, or cyclic configuration, saturated, unsaturated, or aromatic, and combinations thereof, attached to the parent structure through a carbonyl functionality. One or more carbons in the acyl residue may be replaced by nitrogen, oxygen, or sulfur as long as the point of attachment to the parent remains at the carbonyl. Examples include acetyl (Ac), benzoyl, propionyl, isobutyryl, t-butoxycarbonyl, benzyloxycarbonyl, and the like.

Amino acids can be in D- or L-configuration. Suitable amino acids include α-amino acids, β-amino acids, γ-amino acids, δ-amino acids, and ε-amino acids, and include not only natural amino acids (i.e., those found in biological systems, including the twenty amino acids found in natural proteins), but also naturally-occurring variants of such amino acids, as well as synthetic amino acids and their analogues known to those skilled in the art. Exemplary amino acids include, without limitation: the twenty natural amino acids, 4-hydroxyproline, hydroxyysine, demosine, isodemosine, 3-methylhistidine, norvalin, beta-alanine, gamma-aminobutyric acid, citrulline, homocysteine, homoserine, ornithine, and methionine sulfone.

The term "aromatic" or "aryl" means an aromatic monocyclic or multi-cyclic (polycyclic) ring system of 6 to about 19 carbon atoms, for instance, about 6 to about 10 carbon atoms, and includes arylalkyl groups. Representative aryl groups include, but are not limited to, groups such as phenyl, naphthyl, azulenyl, phenanthrenyl, anthracenyl, fluorenyl, pyrenyl, triphenylenyl, chrysenyl, and naphthacenyl. The term "heteroaromatic" or "heteroaryl" means an aromatic monocyclic or multi-cyclic ring system of about 5 to about 19 ring atoms, for instance, about 5 to about 10 ring atoms, in which one or more of the atoms in the ring system is/are element(s) other than carbon, for example, nitrogen, oxygen, and/or sulfur. In the case of multi-cyclic ring systems, only one of the rings needs to be aromatic for the ring system to be defined as "heteroaromatic" or "heteroaryl". Exemplary "heteroaromatic" or "heteroaryl" may contain about 5 or 6 ring atoms. Representative heteroaryls include, but are not limited to, purinyl, pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, quinolinyl, isoquinolinyl, quinazolinyl, cinnolinyl, pthalazinyl, quinoxalinyl, and the like.

The term "fatty acid" generally refers to a carboxylic acid with an aliphatic tail (chain). The aliphatic chain can be between about 2 and about 36 carbon atoms in length. Fatty acids can be saturated, unsaturated, or polyunsaturated. The aliphatic chain can be a linear or a branched chain. The term "fatty acid" may be used herein to refer to a "fatty acid derivative" which can include one or more different fatty acid derivatives, or mixtures of fatty acids derivatives. Exemplary fatty acids include, without limitation, unsaturated fatty acids, saturated fatty acids, and diacids; mono-, di-, and tri-glycerides of ascarosides that have a carboxylic acid functionality; hydroxy acids, co hydroxy acids, co-I hydroxy acids, dihydroxy fatty acids (e.g., dihydroxy fatty acids that are omega- or omega-1 hydroxylated, as well as alpha- or beta-hydroxylated fatty acids).

The term "sugar" includes mono-, di-, tri-, and oligosaccharides. The sugar may be naturally occurring or synthetic. In a particular embodiment, the sugar is a monosaccharide. In a particular embodiment, the monosaccharide is cyclic. In a particular embodiment, the monosaccharide comprises 3-10 carbon atoms. The monosaccharide can be in D- or L-configuration. In a particular embodiment, the monosaccharide is a deoxy sugar. In certain embodiments, the term "sugar" also encompasses carbo-sugars and amino sugars where one or more oxygen atoms (particularly, the ring oxygen of a furanose or pyranose sugar) are replaced by a carbon or nitrogen atom respectively.

"Pharmaceutically acceptable" indicates approval by a regulatory agency of the Federal or a state government or listed in the U.S. Pharmacopeia or other generally recognized pharmacopeia for use in animals, and more particularly in humans. A "carrier" refers to, for example, a diluent, adjuvant, preservative (e.g., Thimersol, benzyl alcohol), anti-oxidant (e.g., ascorbic acid, sodium metabisulfite), solubilizer (e.g., polysorbate 80), emulsifier, buffer (e.g., Tris HCl, acetate, phosphate), antimicrobial, bulking substance (e.g., lactose, mannitol), excipient, auxilliary agent or vehicle with which an active agent of the present invention is administered. Pharmaceutically acceptable carriers can be sterile liquids, such as water and oils, including those of petroleum, animal, vegetable or synthetic origin. Water or aqueous saline solutions and aqueous dextrose and glycerol solutions are preferably employed as carriers, particularly for injectable solutions. Suitable pharmaceutical carriers are described in Remington: The Science and Practice of Pharmacy, (Lippincott, Williams and Wilkins); Liberman, et al., Eds., Pharmaceutical Dosage Forms, Marcel Decker, New York, N.Y.; and Rowe, et al., Eds., Handbook of Pharmaceutical Excipients, Pharmaceutical Pr.

The term "treat" as used herein refers to any type of treatment that imparts a benefit to a patient suffering from an injury, including improvement in the condition of the patient (e.g., in one or more symptoms), delay in the progression of the condition, etc.

As used herein, the term "prevent" refers to the prophylactic treatment of a subject who is at risk of developing a condition and/or sustaining an injury, resulting in a decrease in the probability that the subject will develop conditions associated with the microbiome.

A "therapeutically effective amount" of a compound or a pharmaceutical composition refers to an amount effective to prevent, inhibit, or treat a particular injury and/or the symptoms thereof. For example, "therapeutically effective amount" may refer to an amount sufficient to modulate the pathology associated with a microbiome.

As used herein, the term "subject" refers to an animal, particularly a mammal, particularly a human.

The following examples are provided to illustrate certain embodiments of the invention. They are not intended to limit the invention in any way.

Example 1

Nematodes are among the most abundant organisms in the soil and they strongly influence the composition of the soil microbiota and crop production (Gebremikael, et al. (2016) Sci. Rep., 6:32862; Bjørnlund, et al. (2012) Eur. J. Soil Biol., 50:28-31; Knox, et al. (2004) Appl. Environ. Microbiol., 70:4666-4671; Tu, et al. (2003) Microb. Ecol., 46:134-144; Neher, et al. (2001) J. Nematol., 33:161-168; Hassan, et al. (2013) Acta Agric. Scand. Sect. B—Soil Plant Sci., 63:420-425). Similarly, nematodes are widely distributed animal and human parasites. Nearly 50% of the human population has been affected by nematode infections, which are responsible for several 100,000 deaths annually (Stepek, et al. (2006) Int. J. Exp. Pathol., 87(5):325-341). Nematodes can influence ecosystems either directly, by parasitizing the members of the community and/or altering chemical compositions, or indirectly e.g. by regulating microbial populations (Tu, et al. (2003) Microb. Ecol., 46:134-144; Neher, et al. (2001) J. Nematol., 33:161-168; van Dam, et al. (2016) Trends Plant Sci., 21:256-265).

Nematodes rely on an evolutionarily conserved family of signaling molecules, the ascarosides, to regulate development and social behaviors (Ludewig, et al. (2013) Proc. Natl. Acad. Sci., 110:5522-7; Pungaliya, et al. (2009) Proc. Natl. Acad. Sci., 106:7708-7713). Both free-living and parasitic nematodes produce ascarosides (Manosalva, et al. (2015) Nat. Commun., 6:7795). Plants recognize ascr #18, the most abundant ascaroside in plant-parasitic nematodes, as a conserved molecular signature that activates plant immune responses (Manosalva, et al. (2015) Nat. Commun., 6:7795). Plants employ endogenous peroxisomal β-oxidation to metabolize ascr #18 and generate chemical signals consisting of shorter side-chained ascarosides that deter nematodes. Similar to plants, animals can also recognize and edit ascarosides.

Microbiomes are known to rapidly respond to diverse chemical cues (Lakshmanan, et al. (2014) Plant Physiol., 166:689-700; Kato, et al. (2015) DNA Res., 22:413-424; van Dam, et al. (2016) Trends Plant Sci., 21:256-265). Given that plants and animals respond to ascarosides, it was determined whether bacteria and fungi, an integral part of nematode environments, may have also evolved the capability to perceive and respond to this highly conserved and nematode-specific class of compounds (Ludewig, et al. (2013) Proc. Natl. Acad. Sci., 110:5522-7; Manosalva, et al. (2015) Nat. Commun. 6:7795; Bose et al. (2012) Angew. Chemie—Int. Ed., 51:12438-12443; Zhao, et al. (2016) Nat. Commun., 7:12341). The results provided here indicate that ascarosides play a central role in this signaling network.

To investigate whether ascarosides affect soil microbiomes, soil samples were collected from sites free from pesticide and fertilizer applications to ensure inclusion of a representative diversity of natural microbes (Panke-Buisse, et al. (2015) ISME J., 9:980-9; Lebeis, et al. (2015) Science 349:860-864). The soil samples were treated with low nanomolar concentrations of ascr #18 for 24 hours followed by microbial DNA and metabolome extraction. DNA sequencing was performed by targeting conserved 16s rRNA for bacteria and internal transcribed spacer (ITS) gene for fungi (Panke-Buisse, et al. (2015) ISME J., 9:980-9). Preliminary analyses indicate that ascr #18 shifts microbial composition of the soil.

Figure 1B:
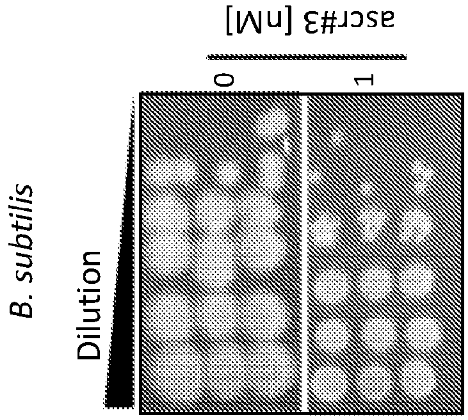
FIG. 1B provides images of *B. subtilis* growth. Bacterial growth media were supplemented with different concentrations of ascarosides. Ten-fold serially diluted bacterial cells were plated and bacterial growth and quantification was performed 18 hours post incubation.

To test whether bacteria respond to ascarosides, a simple growth assay was utilized. When bacterial growth media was supplemented with 1 and 10 nM ascr #18, typical of nematode-associated concentrations of ascr #18 in soil (Manosalva, et al. (2015) Nat. Commun., 6:7795), a significant growth increase for *P. syringae* was observed, whereas two other tested bacteria, *E. coli* and *A. tumefaciens*, were not affected (FIG. 1A). Enhanced growth and rhizosphere colonization of *P. fluorescens* has been observed in the presence of nematodes (Knox, et al. (2004) Appl. Environ. Microbiol., 70:4666-4671) and this may be due to ascr #18 excretion. Next, a wider selection of bacterial species from soil and human environments, including *P. tabacum, P. fluorescens, S. marcescens, E. faecalis*, and *B. subtilis*, was studied. Ascr #18 generally promoted growth of these bacteria. In contrast to ascr #18, the effects of other ascarosides such as ascr #9, ascr #10, and ascr #3 were species-specific. For example, ascr #3, ascr #9, and ascr #10 promoted growth of a human pathogen *S. marcescens* but suppressed *P. fluorescens* and *B. subtilis* (FIG. 1B).

Figure 1C:
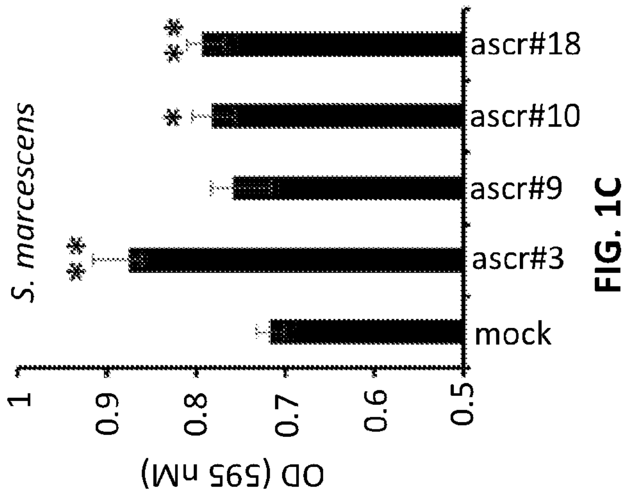
FIG. 1C provides a graph showing biofilm formation of *S. marcescens* in the presence of 1 nM of ascr #3, ascr #9, ascr #10, and ascr #18. *$P<0.05$, **$P<0.001$, two-tailed t-test. Bacterial growth and biofilm assays have been independently repeated at least three times.

The observed changes in bacterial growth upon ascaroside treatment led to determining whether ascarosides also modulate biofilm formation. Biofilm formation represents one of the major defense strategies employed by bacteria against hostile environmental conditions (Flemming, et al. (2016) Nat. Rev. Microbiol., 14(9):563-75). For instance, biofilm formation protects pathogenic bacteria from the host immune system or antibiotics. On the other hand, biofilm formation of beneficial microbes can also be desirable, e.g. because it is important for their positive effects on human health. To quantitatively assess whether ascarosides modulate biofilm formation, a crystal violet-based approach to quantify biomass of the film formed on the surface of a polystyrene 96-well micro-titer plate (Merritt, et al., (2011) Curr. Protoc. Microbiol., doi:10.1002/9780471729259.mc01b01s22). A significant increase of biofilm mass of *S. marcescens* treated with 1 nM of specific ascarosides compared to untreated bacteria was consistently observed (FIG. 1C). Notably, biofilm biomass can also be quantified using qPCR to quantify microbial DNA and determining viable bacterial cell counts in biofilms. Further a high-throughput confocal laser scanning microscopy-based approach can be employed (Schlafer, et al. (2017) J. Microbiol. Methods 138:50-59; Guilbaud, et al. (2015) Appl. Environ. Microbiol., 81:1813-1819).

Comparative metabolomics analyses of soil samples treated with ascr #18 indicates that ascr #18 is extensively edited into shorter side-chained ascarosides as well as potentially ascaroside-derivatives decorated with additional building blocks of diverse metabolic origin. To identify which specific microbes from the soil are responsible for ascr #18 metabolism, the effect of ascr #18 on individual microbes was tested. Bacteria and fungi in the soil interact with nematodes in diverse ways (Lakshmanan, et al. (2014) Plant Physiol., 166:689-700; Knox, et al. (2004) Appl. Environ. Microbiol., 70:4666-4671; Siddiqui, et al. (1999) Bioresour. Technol., 69:167-179). Microbial metabolism of ascr #18 was assessed in three bacteria, *E. coli, Agrobacterium tumefaciens*, and *P. syringae* and two fungi, *Aspergillus fumigatus* and *A. flavus*, all of which are commonly found in soil. Ascr #18 was determined to be metabolized into shorter-chained ascarosides by both fungal species. In contrast, none of the bacteria were able to metabolize ascr #18. Whereas, like fungi, all tested plants and animals are capable of metabolizing ascr #18, it appears that bacteria (and perhaps other prokaryotes) lack this ability.

Example 2

Herein, an example of a synthesis protocol for ascr #18 is provided. The method may be modified to synthesize other ascarosides described herein. For example, the synthesis of ascr #18 metabolites such as ascr #1, ascr #10, and ascr #9 can be performed by replacing 7-bromoheptene in step 1 with a bromo containing compound having the correct number of carbons in the chain for the desired ascaroside.

Synthesis of ascr #18

Starting materials were synthesized as described in cited references or purchased from Sigma-Aldrich or Acros Organics and used without further purification. Anhydrous solvents were prepared with 4 Å molecular sieves. NMR spectra were recorded on a Varian INOVA-600 (600 MHz for $^{1}H$, 151 MHz for $^{13}C$), INOVA-500 (500 MHz for $^{1}H$ and 125 MHz for $^{13}C$), and INOVA-400 (400 MHz for $^{1}H$, 100 MHz for $^{13}C$) instruments. Flash chromatography was performed using a Teledyne ISCO CombiFlash system.

Step 1. (9R)-hydroxydec-1-ene

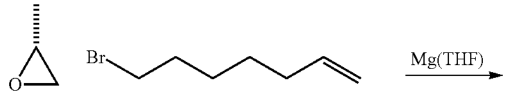

-continued

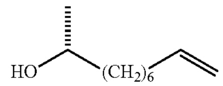

A solution of 7-bromoheptene (300 μg, 2 mmol) in dry THF (1 mL) was added drop wise to magnesium (240 mg, activated with iodine) in THF (500 μL). After stirring at RT for 1 hour the Grignard solution was transferred, cooled to −40° C. and treated with CuI (30 mg, 158 μmol). After stirring for 1 minute, (R)-propylene oxide (100 μL, 2 mmol) in THF (500 μL) was added and the solution stirred for 1.5 hours. The reaction was quenched with $NH_4Cl$ (1 mL), extracted with diethyl ether, dried over $Na_2SO_4$, and concentrated in vacuum. Flash column chromatography on silica gel using an ethyl acetate-hexane gradient (0 to 20%) afforded (8R)-hydroxydec-1-ene (56 mg, 359 μmol, 18% yield) as a colorless liquid. $^{1}H$ NMR (600 MHz, chloroform-d): δ 1.18 (3H, d, J=6.2 Hz), 1.25-1.50 (10H, m), 2.01-2.07 (2H, m), 3.76-3.82 (1H, m), 4.91-4.95 (1H, m), 4.97-5.01 (1H, m), 5.81 (1H, ddt, J=17.1 Hz, 10.4 Hz, 6.7 Hz).

Step 2. (9R)-(3'R,5'R-dibenzoyloxy-6'S-methyl-(2H)-tetrahydropyran-2-yloxy)-dec-1-ene

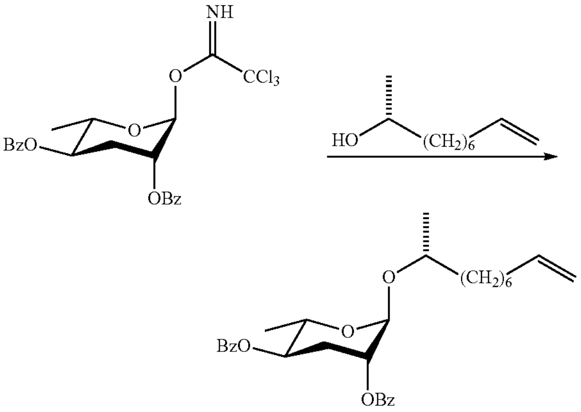

A solution of 2,4-di-O-benzoyl-ascarylose (Jeong et al. (2005) Nature 433:541-545) (139 mg, 390 μmol) in dry DCM (3 mL) was treated with trichloroacetonitrile (84 μL) and DBU (5 μL). After stirring at room temperature for 30 minutes, the solution was concentrated in vacuum. Flash column chromatography on silica gel using a mixture of ethyl acetate in hexane (20%) afforded (3'R,5'R-dibenzoyloxy-6'S-methyl-(2H)-tetrahydropyran-2-yloxy)-1-(2,2,2-trichloroacetimide) (152 mg, 302 μmol, 78%) as a colorless oil. A solution of 2,4-di-O-benzoyl-ascarylose-1-(2,2,2-trichloroacetimide) (152 mg, 302 μmol) in dry DCM (3 mL) at 0° C. was treated with (9R)-hydroxydec-1-ene (55 mg, 350 μmol) and trimethylsilyloxytriflate (5 μL). After 3 hours the solution was washed with saturated aqueous $NaHCO_3$ solution (0.5 mL), dried over $Na_2SO_4$ and concentrated in vacuum. Flash column chromatography on silica gel using a ethyl acetate—hexane gradient (5 to 20%) afforded (9R)-(3'R,5'R-dibenzoyloxy-6'S-methyl-(2H)-tetrahydropyran-2-yloxy)-dec-1-ene (91.1 mg, 184 μmol, 61%) as a colorless oil. 41 NMR (400 MHz, chloroform-d): δ 1.20 (3H, d, J=6.1 Hz), 1.30 (3H, d, J=6.1 Hz), 1.33-1.72 (10H, m), 2.09 (2H, m), 2.23 (1H, ddd, J=13.5 Hz, J=11.4 Hz, J=2.9 Hz), 2.44

(1H, m), 3.87 (1H, m), 4.15 (1H, dq, J=9.8 Hz, J=6.1 Hz), 4.95 (1H, ddt, J=10.2 Hz, J=2.2 Hz, J=1.3 Hz), 4.98 (1H, s. br), 5.02 (1H, ddt, J=17.1, Hz. J=2.2 Hz, J=1.6 Hz), 5.17 (1H, s. br), 5.21 (1H, ddd, J=10.3 Hz, J=4.6 Hz), 5.83 (1H, ddt, J=17.1 Hz, J=10.3 Hz, J=6.8 Hz), 7.45-7.51 (4H, m), 7.57-7.62 (2H, m), 8.06 (2H, m), 8.13 (2H, m); $^{13}C$ NMR (100 MHz, chloroform-d): δ 17.84, 19.14, 25.65, 28.84, 29.08, 29.38, 29.68, 33.76, 37.08, 66.89, 70.62, 71.21, 72.53, 93.72, 114.20, 128.38, 129.55, 129.80, 129.82, 129.96, 133.12, 133.17, 139.01, 165.59, 165.72.

Step 3. Ethyl (10R)-(3'R,5'R-dibenzoyloxy-6'S-methyl-(2H)-tetrahydropyran-2-yloxy)-undec-2-enoate

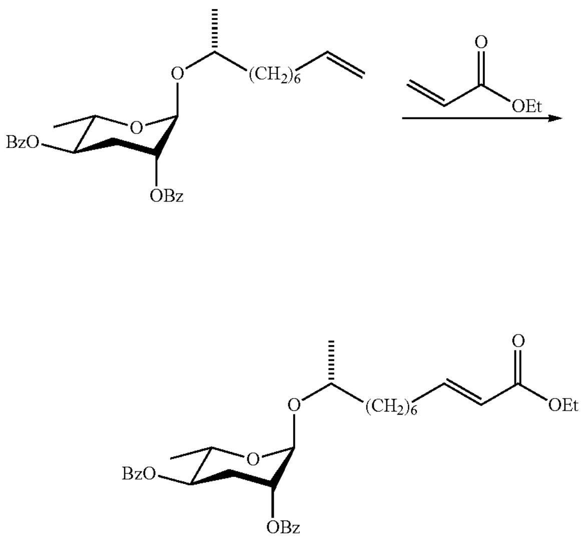

A solution of (9R)-(3'R,5'R-dibenzoyloxy-6'S-methyl-(2H)-tetrahydropyran-2-yloxy)-dec-1-ene (62 mg, 125 μmol) and ethyl propenoate (66 mg, 626 mol) in DCM (5 mL) was treated with 1.4-benzoquinone (1.4 mg, 13 mol) and Grubbs-II catalyst (5.3 mg, 6.3 mol). After stirring at 40° C. for 15 hours, the reaction was filtered through a pad of silica using DCM:ethyl acetate (3:1). Flash column chromatography on silica gel using a ethyl acetate—hexanes gradient (10 to 50%) afforded ethyl (10R)-(3'R,5'R-dibenzoyloxy-6'S-methyl-(2H)-tetrahydropyran-2-yloxy)-undec-2-enoate (55 mg, 97 mol, 78%) as a colorless oil. $^{1}H$ NMR (400 MHz, chloroform-d): δ 1.19 (3H, d, J=6.1 Hz), 1.27 (3H, t, J=7.1 Hz), 1.28 (3H, d, J=6.3 Hz), 1.33-1.70 (10H, m), 2.16-2.26 (3H, m), 2.38-2.46, (1H, m), 3.84 (1H, m), 4.07-4.15 (1H, m), 4.17 (2H, q, J=7.1 Hz), 4.95 (1H, s. br), 5.12-5.23 (2H, m), 5.78-5.85 (1H. m), 6.97 (1H, dt, J=15.6 Hz, 7.0 Hz), 7.42-7.50 (4H, m), 7.55-7.62 (2H, m), 8.01-8.06 (2H, m), 8.09-8.14 (2H, m). $^{13}C$ NMR (100 MHz, chloroform-d): δ 14.42, 18.03, 19.30, 25.78, 28.16, 29.28, 29.53, 29.87, 32.32, 37.23, 60.29, 67.09, 70.80, 71.38, 72.78, 93.93, 117.65, 121.44, 128.58, 129.73, 129.98, 129.99, 130.13, 133.32, 133.38, 149.44, 165.80, 165.93, 166.89.

Step 4. (10R)-(3'R,5'R-dihydroxy-6'S-methyl-(2H)-tetrahydropyran-2-yloxy)-undec-2-enoic acid (ascr #17)

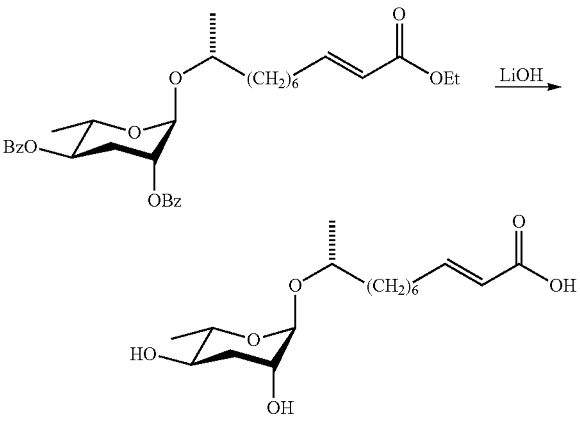

A solution of ethyl (10R)-(3'R,5'R-dibenzoyloxy-6'S-methyl-(2H)-tetrahydropyran-2-yloxy)-undec-2-enoate (55 mg, 97 mol) in THF (1 mL) was added to a solution of lithium hydroxide (48 mg, 2 mmol) in water (380 μL) and 1,4-dioxane (2 mL). After stirring at 67° C. for 3 hours the mixture was neutralized with acetic acid and concentrated in vacuum. Flash column chromatography on silica gel using a methanol-dichloromethane gradient (0 to 30%) afforded (10R)-(3'R,5'R-dihydroxy-6'S-methyl-(2H)-tetrahydropyran-2-yloxy)-undec-2-enoic acid (ascr #17)(25.2 mg, 76.4 mol, 79%) as a colorless oil. $^{1}H$ NMR (500 MHz, methanol-$d_4$): δ 1.12 (3H, d, J=6.1 Hz), 1.21 (3H, d, J=6.3 Hz), 1.33-1.60 (10H, m), 1.76 (1H, ddd, J=13.3 Hz, J=11.4 Hz, J=3.1 Hz), 1.95 (1H, dt. br, J=13.1 Hz, J=4.1 Hz), 2.23 (2H, ddt, J=7.3 Hz, J=1.7 Hz, J=7.6 Hz), 3.52 (1H, ddd, J=11.3 Hz, J=9.5 Hz, J=4.6 Hz), 3.63 (1H, dq, J=9.3 Hz, J=6.4 Hz), 3.71 (1H, m), 3.78 (1H, m), 4.64 (1H, s. br), 5.80 (1H, dt, J=15.7 Hz, J=1.4 Hz), 6.95 (1H, dt, J=15.6 Hz, J=7.0 Hz); $^{13}C$ NMR (100 MHz, methanol-$d_4$): δ 18.27, 19.53, 26.95, 29.40, 30.40, 30.61, 33.29, 36.09, 38.51, 68.45, 70.10, 71.30, 72.62, 97.67, 122.75, 151.25, 170.37.

Step 5. (10R)-(3'R,5'R-dihydroxy-6'S-methyl-(2H)-tetrahydropyran-2-yloxy)-undecanoic acid (ascr #18)

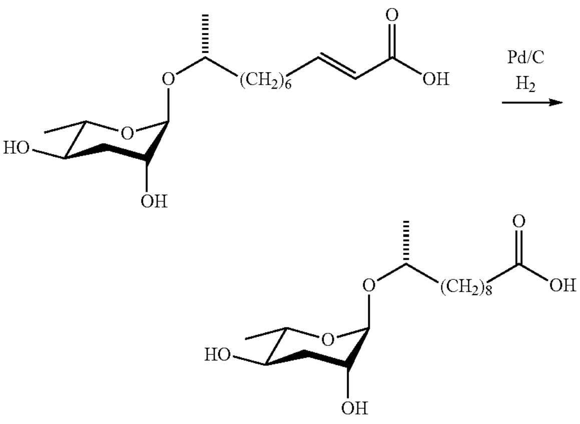

A solution of (10R)-(3'R,5'R-dihydroxy-6'S-methyl-(2H)-tetrahydropyran-2-yloxy)-undec-2-enoic acid (5 mg, 104 μmol) in methanol (1 mL) was treated with Pd/C (10% w/w) and hydrogenated for 14 hours. The solution was filtered and concentrated in vacuum to afford (10R)-(3'R, 5'R-dihydroxy-6'S-methyl-(2H)-tetrahydropyran-2-yloxy)-undecanoic acid (4.4 mg, 76.4 μmol, 73%) as a colorless oil. $^{1}H$ NMR (500 MHz, methanol-$d_4$): δ 1.12 (H, d, J=6.1 Hz), 1.21 (3H, d, J=6.3 Hz), 1.33-1.60 (14H, m), 1.76 (1H, ddd, J=13.3 Hz, J=11.4 Hz, J=3.1 Hz), 1.95 (1H, dt. br, J=13.1 Hz, J=4.1 Hz), 2.27 (2H, t, J=7.6 Hz), 3.52 (1H, ddd, J=11.3 Hz, J=9.5 Hz, J=4.6 Hz), 3.63 (1H, dq, J=9.3 Hz, J=6.4 Hz), 3.71 (1H, m), 3.78 (1H, m), 4.64 (1H, s. br); $^{13}C$ NMR (100 MHz, methanol-$d_4$): δ 18.11, 19.37, 26.40, 26.88, 30.37, 30.48, 30.61, 30.67, 35.97, 38.42, 68.34, 69.99, 71.17, 72.51, 97.56, 178.6.

Several publications and patent documents are cited throughout the specification in order to describe the state of the art to which this invention pertains. Each of these citations is incorporated herein by reference as though set forth in full.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A method of modifying the composition of a microbiome, said method comprising directly contacting the microbiome with a composition comprising an ascaroside, wherein the modification comprises modifying the growth of a bacterial species present in the microbiome relative to a control not treated with the composition.

2. The method of claim 1, wherein the modification is enhancing the growth rate of the bacterial species or inhibiting the growth rate of the bacterial species.

3. The method of claim 1, wherein the modification comprises modifying biofilm formation by the bacterial species.

4. The method of claim 3, wherein the ascaroside is selected from the group consisting of ascr #3, ascr #9, ascr #10, and ascr #18.

5. The method of claim 3, wherein the modification comprises inhibiting biofilm formation.

6. The method of claim 3, wherein the modification comprises enhancing biofilm formation.

7. The method of claim 1, wherein the modification comprises modifying the relative abundance of two or more bacterial species present in the microbiome relative to a control not treated with the composition.

8. The method of claim 1, wherein the modification comprises increasing the relative abundance of one or more bacterial species beneficial to the health of a target organism in contact with the modified microbiome.

9. The method of claim 1, wherein the modification comprises decreasing the relative abundance of one or more bacterial species detrimental to the health of a target organism in contact with the modified microbiome.

10. The method of claim 1, wherein the microbiome is one in contact with a plant.

11. The method of claim 10, wherein the plant microbiome comprises endophytes.

12. The method of claim 10, wherein the plant microbiome comprises rhizophytes.

13. The method of claim 1, wherein the ascaroside is selected from the group consisting of ascr #3, ascr #9, ascr #10, and ascr #18.

14. The method of claim 13, wherein the ascaroside is ascr #18.

15. The method of claim 13, wherein the ascaroside is selected from the group consisting of ascr #3, ascr #9, and ascr #10, and wherein the modification comprises decreasing the growth of *Pseudomonas fluorescens* and *Bacillus subtilis*.

16. A method of enhancing the growth of a crop plant comprising directly contacting microorganisms in a soil in contact with the crop plant with a composition comprising an ascaroside, wherein the enhanced growth of the crop plant is due to effects of the ascaroside on the growth of microorganisms present in the soil, wherein the effect of the ascaroside comprises modifying the growth of a bacterial species present in the soil relative to a control soil not treated with the composition.

17. The method of claim 16, wherein the modification is enhancing the growth rate of the bacterial species or inhibiting the growth rate of the bacterial species.

18. The method of claim 16, wherein the modification comprises disrupting biofilm formation by the bacterial species.

19. The method of claim 16, wherein the effect of the signaling molecule comprises modifying the relative abundance of two or more bacterial species present in the microbiome relative to a control not treated with the composition.

20. The method of claim 19, wherein the modification comprises increasing the relative abundance of one or more bacterial species beneficial to the health of the crop plant.

21. The method of claim 19, wherein the modification comprises decreasing the relative abundance of one or more bacterial species detrimental to the health of the crop plant.

22. The method of claim 16, wherein the ascaroside is selected from the group consisting of ascr #3, ascr #9, ascr #10, and ascr #18.

23. A method of modifying the composition of a microbiome, said method comprising directly contacting the microbiome with a composition comprising an ascaroside, wherein the modification comprises modifying the growth of a bacterial species present in the microbiome relative to a control not treated with the composition, and wherein the modification comprises modifying biofilm formation by the bacterial species.

24. The method of claim 23, wherein the ascaroside is selected from the group consisting of ascr #3, ascr #9, ascr #10, and ascr #18.

25. A method of enhancing the growth of a crop plant comprising contacting a soil in contact with the crop plant with a composition comprising an ascaroside, wherein the enhanced growth of the crop plant is due to effects of the ascaroside on the growth of microorganisms present in in the soil, wherein the effect of the ascaroside comprises modifying the growth of a bacterial species present in the soil relative to a control soil not treated with the composition, and wherein the modification comprises modifying biofilm formation by the bacterial species.

26. A method of modifying the composition of a microbiome, said method comprising contacting an assemblage of organisms composing the microbiome with a composition comprising an ascaroside, wherein the modification comprises modifying the growth of a bacterial species present in the microbiome relative to a control not treated with the composition, wherein the ascaroside is selected from the group consisting of ascr #3, ascr #9, ascr #10, and ascr #18, and wherein the modification comprises increasing the growth of *Serratia marcescens*.

* * * * *